United States Patent
Niggemeier et al.

(10) Patent No.: US 10,458,333 B2
(45) Date of Patent: Oct. 29, 2019

(54) REDUCED STRESS BOSS GEOMETRY FOR A GAS TURBINE ENGINE

(71) Applicant: United Technologies Corporation, Farmington, CT (US)

(72) Inventors: Chris J. Niggemeier, Manchester, CT (US); Lifang Yuan, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 355 days.

(21) Appl. No.: 15/120,204

(22) PCT Filed: Feb. 19, 2015

(86) PCT No.: PCT/US2015/016669
§ 371 (c)(1),
(2) Date: Aug. 19, 2016

(87) PCT Pub. No.: WO2015/175076
PCT Pub. Date: Nov. 19, 2015

(65) Prior Publication Data
US 2016/0356222 A1 Dec. 8, 2016

Related U.S. Application Data

(60) Provisional application No. 61/941,787, filed on Feb. 19, 2014.

(51) Int. Cl.
F01D 25/12 (2006.01)
F02C 7/20 (2006.01)
(Continued)

(52) U.S. Cl.
CPC .............. F02C 7/20 (2013.01); B23C 3/12 (2013.01); F01D 21/003 (2013.01); F01D 25/24 (2013.01);
(Continued)

(58) Field of Classification Search
CPC .. F01D 25/28; F01D 25/24; F02C 7/20; F02C 3/04; F05D 2230/53; F05D 2250/11; F05D 2250/12; F05D 2250/121; F05D 2250/131; F05D 2250/19; F05D 2250/29; F05D 2250/292; F23R 2900/00018; F23T 3/00;
(Continued)

(56) References Cited

U.S. PATENT DOCUMENTS 9,316,108 B2 4/2016 Pegan, Jr. et al.
2002/0061373 A1 5/2002 Foster
(Continued)

FOREIGN PATENT DOCUMENTS

EP 2636855 A1 9/2013
FR 2992019 A1 12/2013

OTHER PUBLICATIONS

Supplementary European Search Report dated Oct. 26, 2017 for European Patent Applicaton No. 15792548.8.
(Continued)

Primary Examiner — Craig Kim
(74) Attorney, Agent, or Firm — Bachman & LaPointe, P.C.

(57) ABSTRACT

A case for a gas turbine engine includes a case wall and a boss that extends from the case wall. The boss includes a perimeter step.

9 Claims, 6 Drawing Sheets

(51) Int. Cl.
    *F01D 25/24*     (2006.01)
    *F01D 21/00*     (2006.01)
    *F23M 11/04*     (2006.01)
    *F23R 3/00*     (2006.01)
    *B23C 3/12*     (2006.01)
    *F02C 3/04*     (2006.01)

(52) U.S. Cl.
    CPC ............... *F02C 3/04* (2013.01); *F23M 11/04* (2013.01); *F23R 3/002* (2013.01); *F05D 2230/53* (2013.01); *F05D 2230/72* (2013.01); *F05D 2250/11* (2013.01); *F05D 2250/12* (2013.01); *F05D 2250/121* (2013.01); *F05D 2250/131* (2013.01); *F05D 2260/941* (2013.01); *F23R 2900/00018* (2013.01); *Y02T 50/671* (2013.01)

(58) Field of Classification Search
    CPC .... F23T 3/002; B23P 2700/13; Y10T 29/4932
    See application file for complete search history.

(56) References Cited

U.S. PATENT DOCUMENTS

| | | |
|---|---|---|
| 2003/0131603 A1 | 7/2003 | Bolender et al. |
| 2006/0254661 A1 | 11/2006 | Vintilescu et al. |
| 2007/0128042 A1* | 6/2007 | Weisse .................... B23P 15/04 416/233 |
| 2008/0078227 A1 | 4/2008 | Green et al. |
| 2010/0132376 A1 | 6/2010 | Durocher et al. |
| 2013/0224012 A1* | 8/2013 | Durocher ................ F01D 25/28 415/213.1 |
| 2014/0037442 A1* | 2/2014 | Tatman ................... F01D 9/042 415/208.1 |
| 2015/0240662 A1* | 8/2015 | Niggemeier ............ F01D 25/24 415/207 |

OTHER PUBLICATIONS

International Search Report for PCT/US2015/016669 dated Nov. 21, 2015.

* cited by examiner

REDUCED STRESS BOSS GEOMETRY FOR A GAS TURBINE ENGINE

CROSS-REFERENCE TO RELATED APPLICATION

This application claims priority to U.S. Provisional Patent Application Ser. No. 61/941,787 filed Feb. 19, 2014, which is hereby incorporated herein by reference in its entirety.

BACKGROUND

The present disclosure relates to a gas turbine engine and, more particularly, to a case therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

For fully machined engine cases, an abrupt transition from a thin case wall/shell to a relatively thick case boss, especially in relatively high pressure vessel diffuser cases, often results in stress concentrations in the transition with an associated reduction in case service life.

SUMMARY

A case for a gas turbine engine, according to one disclosed non-limiting embodiment of the present disclosure, includes a case wall and a boss that extends from the case wall. The boss includes a perimeter step.

In a further embodiment of the present disclosure, the perimeter step is radiused.

In a further embodiment of any of the foregoing embodiments of the present disclosure, the perimeter step defines a radius between 0.0625"-0.25" (1.588-6.35 mm).

In a further embodiment of any of the foregoing embodiments of the present disclosure, the boss includes a through hole.

In a further embodiment of any of the foregoing embodiments of the present disclosure, the perimeter step defines a height generally parallel to a flat top surface of the boss.

In a further embodiment of any of the foregoing embodiments of the present disclosure, the case wall defines a first thickness and the boss defines a second thickness.

In a further embodiment of any of the foregoing embodiments of the present disclosure, the case is a diffuser case.

In a further embodiment of any of the foregoing embodiments of the present disclosure, the boss is triangular shaped.

In a further embodiment of any of the foregoing embodiments of the present disclosure, the boss is rhomboid shaped.

A case for a gas turbine engine, according to another disclosed non-limiting embodiment of the present disclosure, includes a case wall that defines a first thickness. A boss extends from the case wall. The boss includes a perimeter step of a uniform height.

In a further embodiment of any of the foregoing embodiments of the present disclosure, the perimeter step defines a height generally parallel to a flat top surface of the boss.

In a further embodiment of any of the foregoing embodiments of the present disclosure, the perimeter step is radiused.

In a further embodiment of any of the foregoing embodiments of the present disclosure, the perimeter step defines a radius between 0.0625"-0.25" (1.588-6.35 mm).

In a further embodiment of any of the foregoing embodiments of the present disclosure, the perimeter step defines a height generally parallel to a flat top surface of the boss.

A method of reducing stress in a case of a gas turbine engine, according to another disclosed non-limiting embodiment of the present disclosure, includes machining a perimeter step of a uniform height into a boss.

In a further embodiment of any of the foregoing embodiments of the present disclosure, the method includes 3-axis milling the boss.

In a further embodiment of any of the foregoing embodiments of the present disclosure, the method includes multi-axis milling the boss.

In a further embodiment of any of the foregoing embodiments of the present disclosure, the method includes matching the boss to a desired case wall thickness.

In a further embodiment of any of the foregoing embodiments of the present disclosure, the method includes machining the perimeter step as a radius.

In a further embodiment of any of the foregoing embodiments of the present disclosure, the method includes machining a second perimeter step adjacent to the perimeter step.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 4 is an expanded view of other example boss geometries;

DETAILED DESCRIPTION

Figure 1:
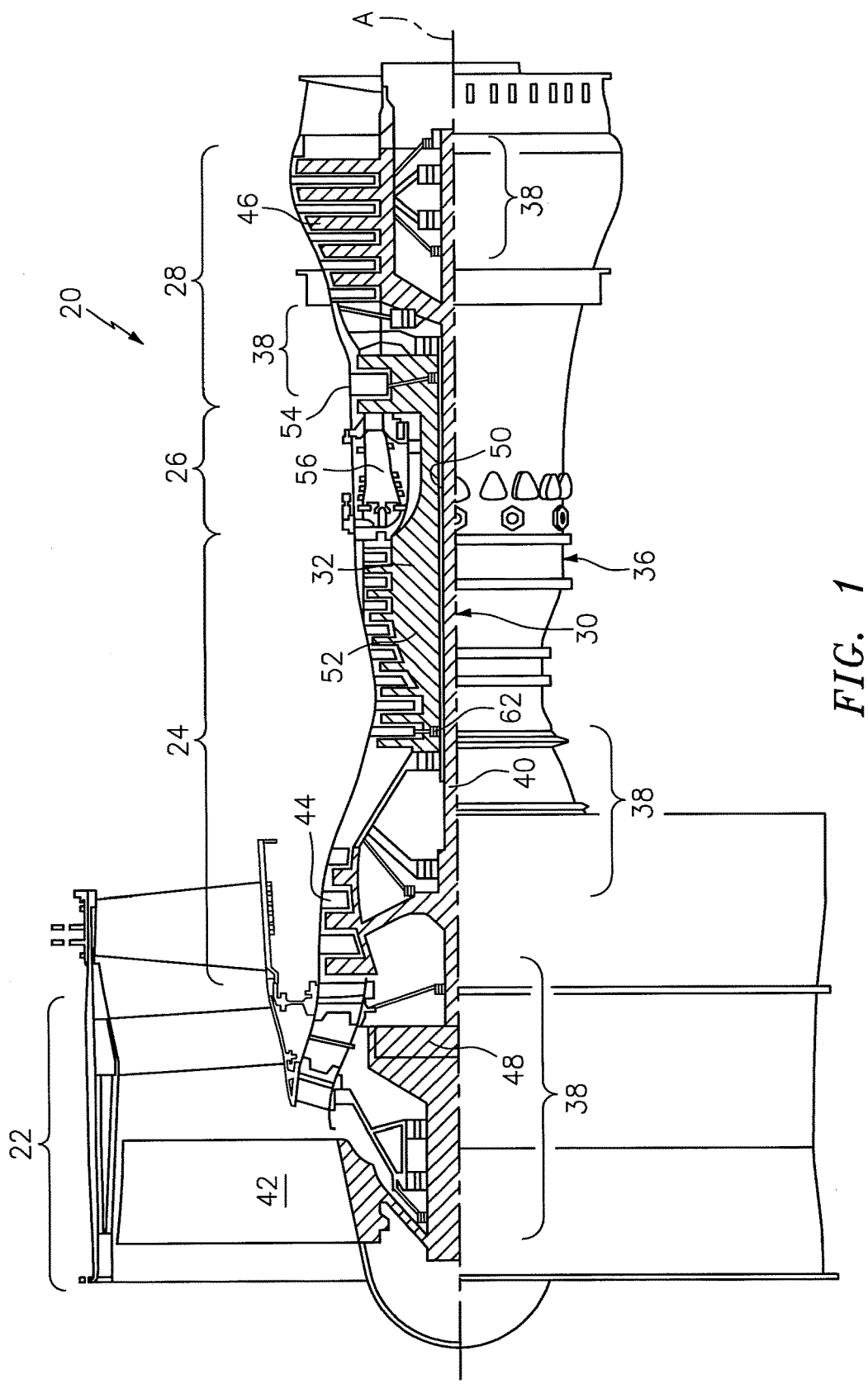
FIG. 1 is a schematic cross-section of an example gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines (not shown) might include an augmentor section among other systems or features. Although depicted as a high-bypass turbofan in the disclosed non-limiting embodiment, it should be appreciated that the concepts described herein are not limited to use only with turbofan architectures as the teachings may be applied to other types of turbine engines such as turbojets, turboshafts, industrial gas turbines, and three-spool (plus fan) turbofans with an intermediate spool.

The engine 20 generally includes a low spool 30 and a high spool 32 mounted for rotation about an engine central longitudinal axis A relative to an engine case structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and a high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The LPT 46 and the HPT 54 rotationally drive the respective low spool 30 and high spool 32 in response to the expansion.

Figure 2:
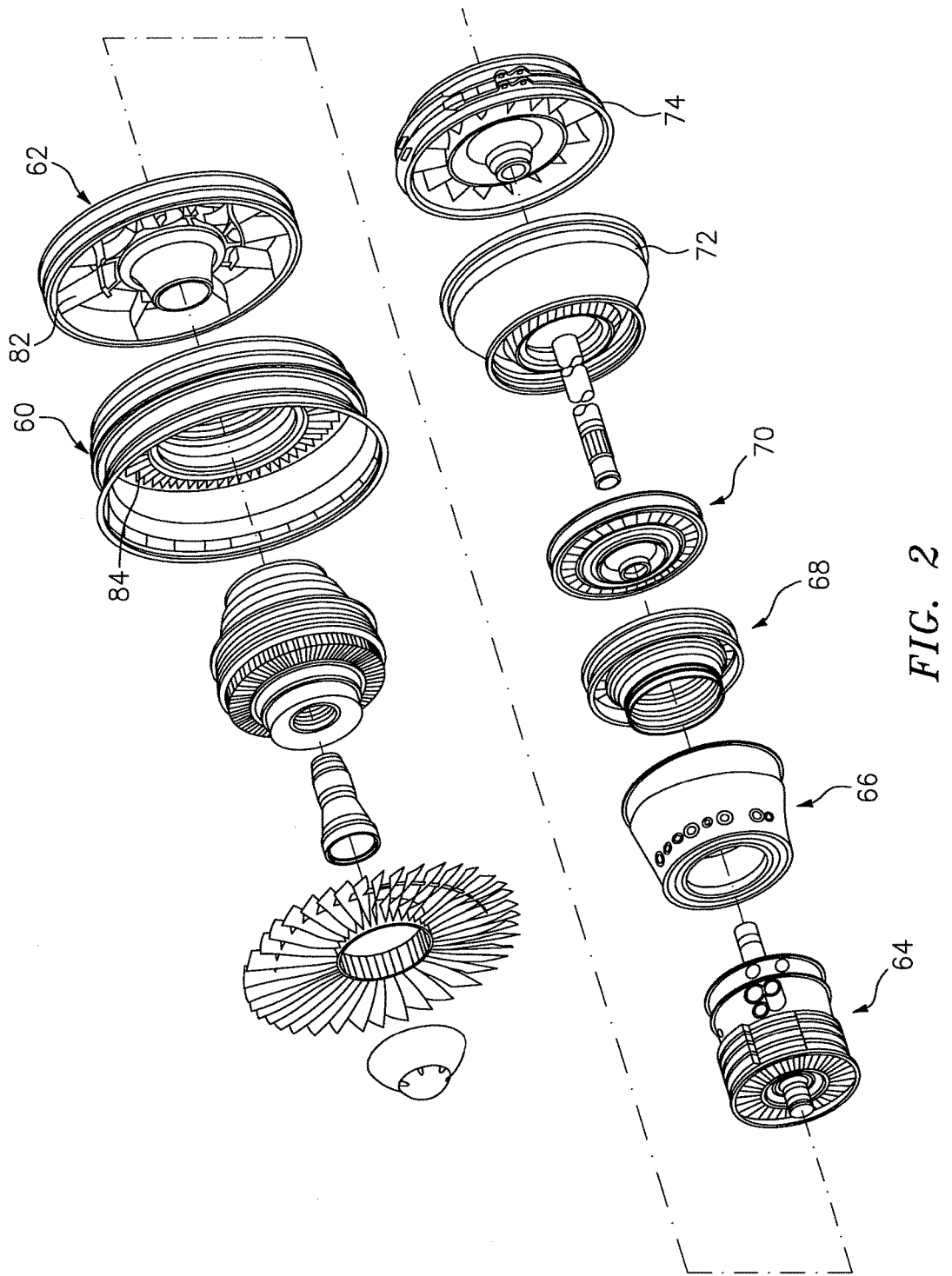
FIG. 2 is an exploded view of the engine of FIG. 1 separated into modules.

With reference to FIG. 2, the engine case structure 36 (see FIG. 1) generally includes an assembly of a multiple of cases or modules to include a fan case 60, an intermediate case 62, a HPC case 64, a diffuser case 66, a High Pressure Turbine (HPT) case 68, a mid turbine frame (MTF) case 70, a Low Pressure Turbine (LPT) case 72, and a Turbine Exhaust case (TEC) 74. It should be appreciated that various additional or alternative cases will also benefit herefrom and the cases 60-74 may be assembled or disassembled for maintenance at any interface.

Figure 3:
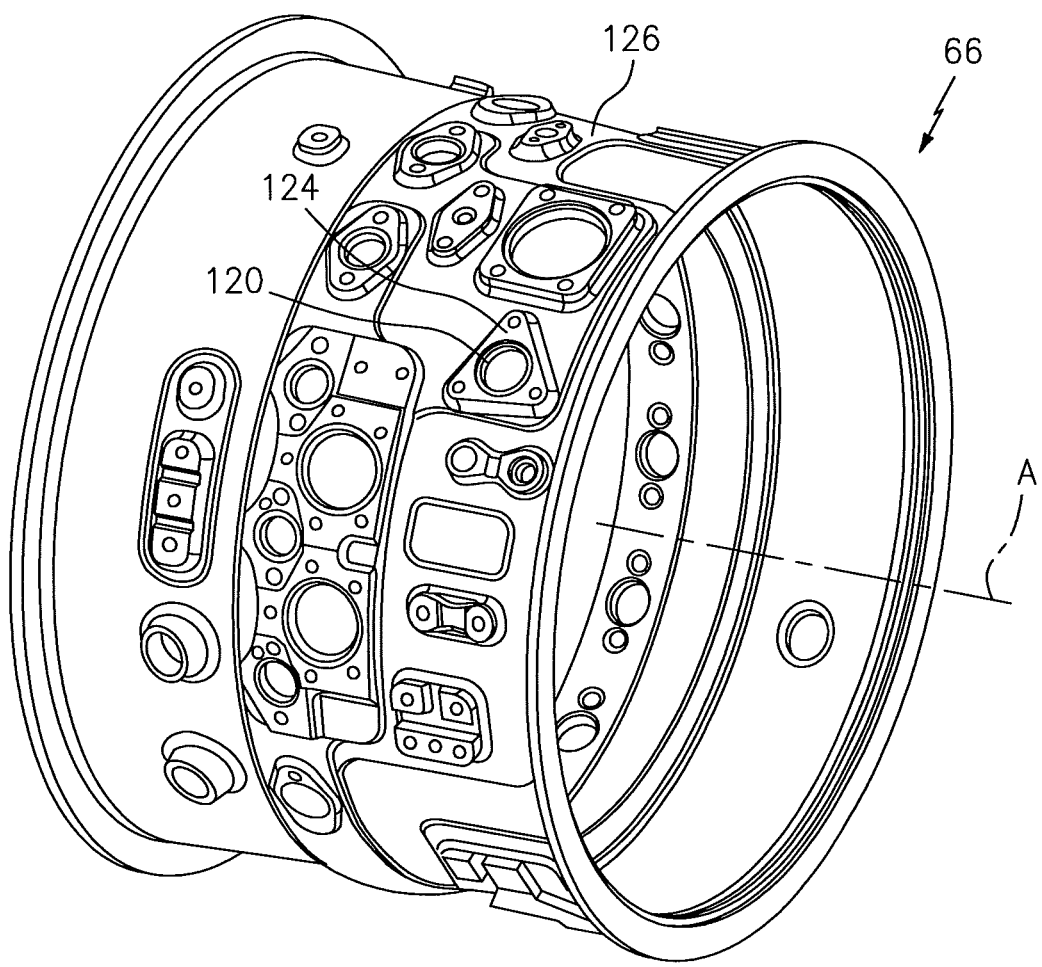
FIG. 3 is a perspective view of a diffuser case of the diffuser module.

With reference to FIG. 3, the diffuser case 66 generally includes a multiple of through-holes 120 which penetrate through a wall 122 typical of holes configured to receive instrumentation such as a borescope, threaded holes for bolts to mount various components such as the fuel injectors and other types of apertures. It should be further appreciated that although a diffuser case is illustrated in one disclosed non-limiting embodiment, various cases will also benefit herefrom.

The through-holes 120 may be defined through a boss 124 or other feature that radially extends from an outer surface 126 of the wall 122 (see FIG. 4) to define a local thickness greater than a thickness of the wall 122. That is, the boss 124 forms a localized case thickness greater than the wall 122. It should be appreciated that various cast and fully-machined engine case structures and boss geometries such as triangular 124 (see FIG. 4), rhomboid 124' (see FIG. 5), rectilinear 124" (see FIG. 5), circular, oval, diamond, irregular, and other raised portions will benefit herefrom.

The diffuser case 66 is pressurized, which produces hoop stresses in the wall 122. The bosses 124 may heretofore generate stress concentrations in the wall material that may otherwise reduce the strength and life of the component due, at least in part to the abrupt transition from a thin case wall/shell to a relatively thick case boss, especially in relatively high pressure vessel diffuser cases.

Figure 4:
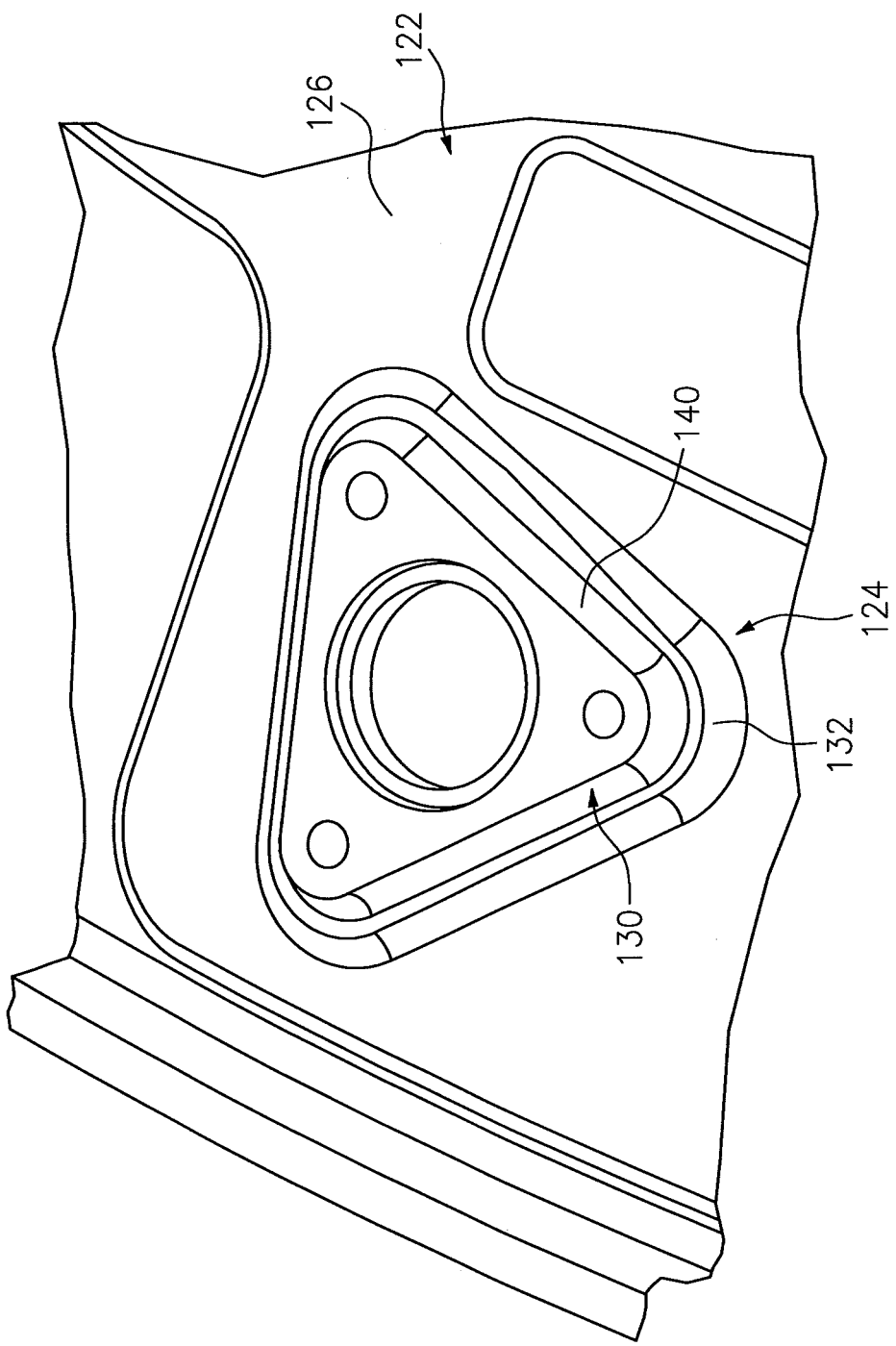
FIG. 4 is an expanded view of a boss according to one disclosed non-limiting embodiment.
Figure 5:
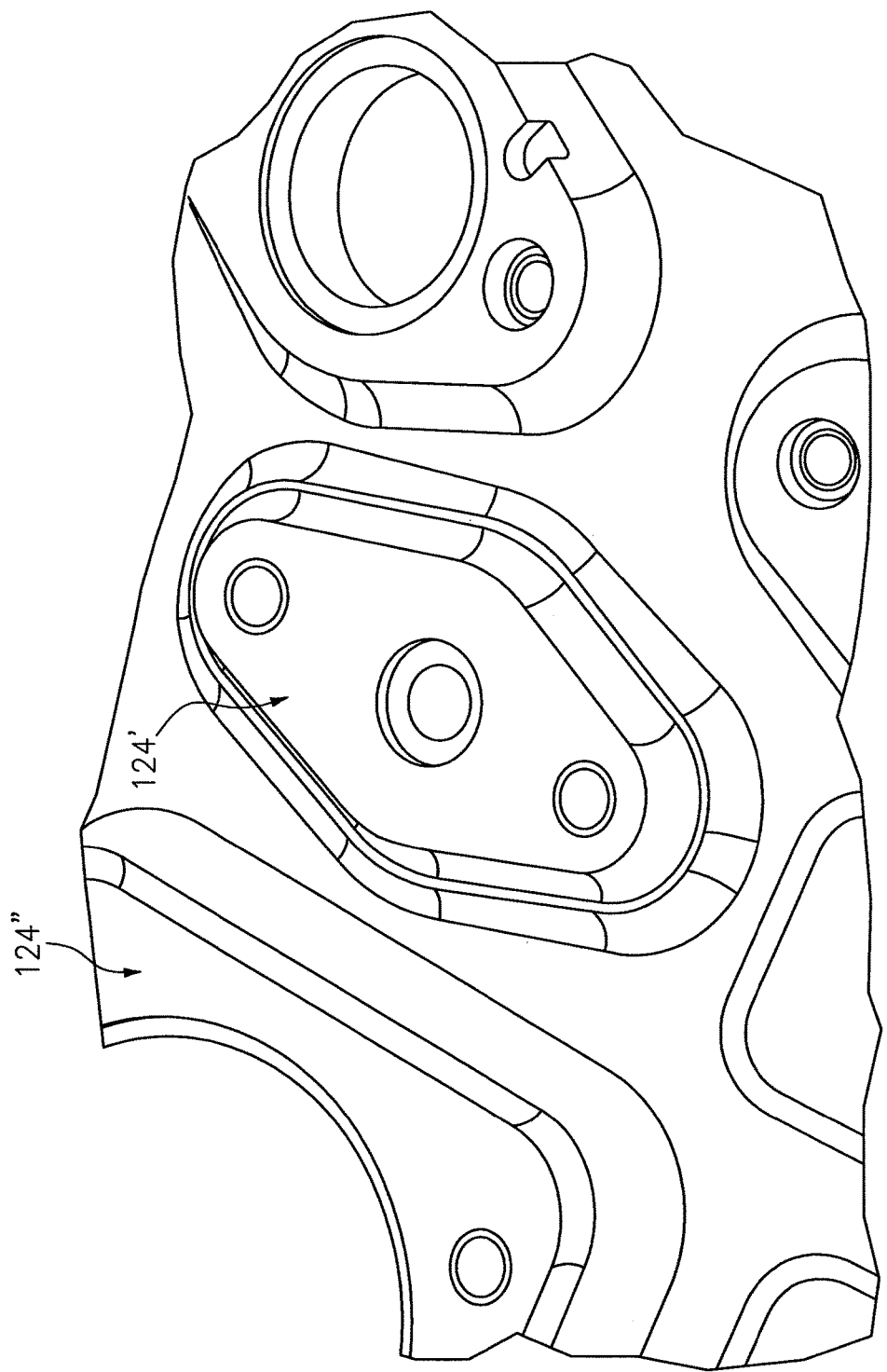
Figure 6:
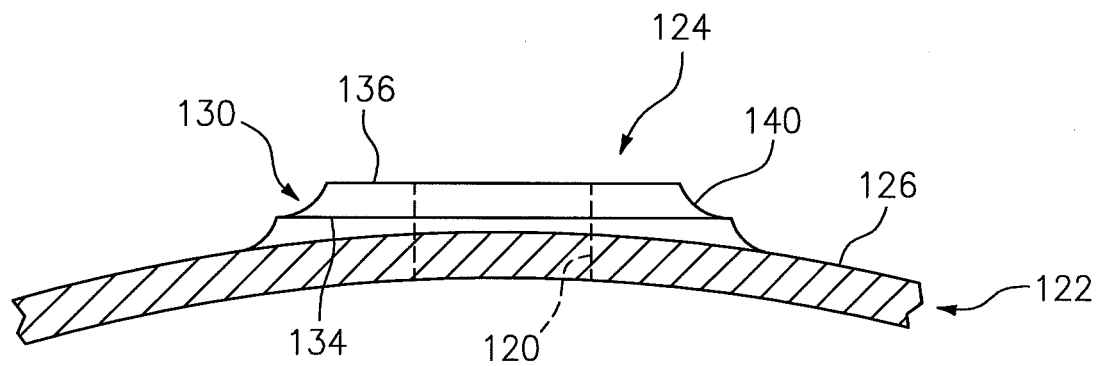
FIG. 6 is a sectional view of a boss with a perimeter step according to one disclosed non-limiting embodiment.

With reference to FIG. 4, to reduce these stresses, a perimeter step 130 is milled about a perimeter 132 of the boss 124. The perimeter step 130 results in a more gradual transition from the thin case wall 122 to the thick boss 124 to thereby reduce the stress concentrations. The perimeter step 130 in this disclosed non-limiting embodiment has a uniform height, e.g., is 3-axis milled/machined. That is, the perimeter step 130 defines a height 134 generally parallel to a flat top surface 136 of the boss 124 and not necessarily parallel to the outer surface 126 of the wall 122 which is curved (see FIG. 6).

In one disclosed non-limiting embodiment, the perimeter step 130 may be formed as a radius 140. The radius 140 may be, for example, between about 0.0625"-0.25" (1.588-6.35 mm), which may be readily formed with typical tool bits. It should be appreciated that the fillet and corner radii as well as perimeter step height can be selected to further reduce the stress concentration.

Figure 7:
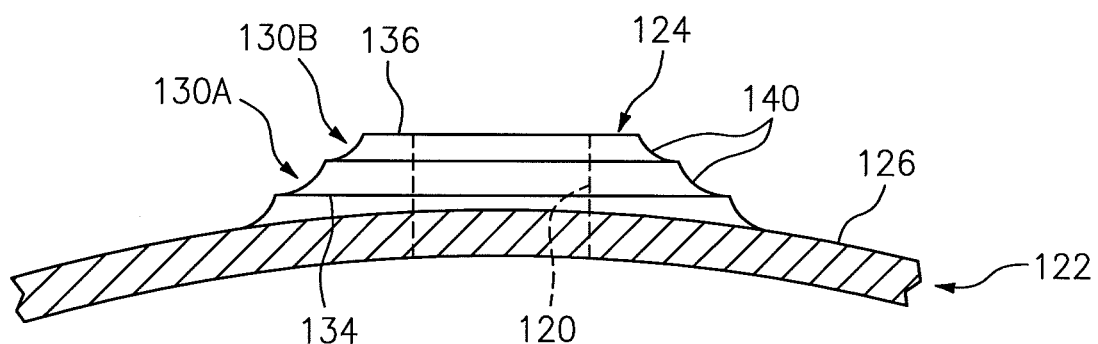
FIG. 7 is a sectional view of a boss with a perimeter step according to another disclosed non-limiting embodiment.

With reference to FIG. 7, in another disclosed non-limiting embodiment, multiple perimeter steps 130A, 130B (two shown) are provided to provide a still further gradual transition from the relatively thin case wall 122 to the relatively thick boss 124. Each of the multiple perimeter steps 130A, 130B may also have a uniform height and, for example, 3-axis milled/machined.

It should be appreciated that as a fully machined case is machined down to the wall 122 thickness in areas other than the bosses 124, the incorporation of the perimeter steps 130 are readily achieved and may result in a net reduction in weight. In other words, although it might appear that there is additional machining required, the heretofore complex 5-axis milling to form the boss perimeter and follow the curved profile of the wall is replaced by a relatively simpler 3-axis milling. This not only makes for simpler geometry in the immediate vicinity around the boss 124 and less chance of machining mismatches in the high stress areas but also facilitates an improved surface finish around the boss profile as it is relatively less complicated to achieve a good surface finish when machining a flat surface as opposed to a compound curvature.

The peripheral perimeter step significantly increases case life while at the same time minimizing any weight increase. Furthermore, the relatively small weight increase associated with the extra machined perimeter step(s) is offset by the weight decrease that would be attributed to removal of relatively large and numerous doublers and/or triplers 126 that are conventionally utilized.

It should be understood that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

Although particular perimeter step sequences are shown, described, and claimed, it should be understood that perimeter steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A case for a gas turbine engine, comprising:
a machined case wall;
a first perimeter step that extends from the machined case wall via a radius machined around a periphery of the first perimeter step; and
a second perimeter step that extends from the first perimeter step via a radius machined around a periphery of the second perimeter step, the first perimeter step and the second perimeter step form a boss with a boss thickness greater than the machined case wall thickness.

2. The case as recited in claim 1, wherein the periphery of the first perimeter step and the periphery of the second perimeter step is triangular shaped.

3. The case as recited in claim 1, wherein the periphery of the first perimeter step and the periphery of the second perimeter step is rhomboid shaped.

4. The case as recited in claim 1, wherein the periphery of the first perimeter step and the periphery of the second perimeter step are of an equivalent shape.

5. The case as recited in claim 1, wherein the first perimeter step and the second perimeter step each defines a uniform height with respect to a flat top surface of the boss.

6. The case as recited in claim 5, wherein the perimeter step defines a radius between 0.0625"-0.25" (1.588-6.35 mm).

7. The case as recited in claim 5, wherein the case wall is cylindrical.

8. The case as recited in claim 1, wherein the boss includes a through hole.

9. The case as recited in claim 1, wherein the boss defines a flat top surface with respect to an arcuate surface of the machined case wall.

* * * * *